US012230916B2

(12) United States Patent
Miyamura et al.

(10) Patent No.: US 12,230,916 B2
(45) Date of Patent: Feb. 18, 2025

(54) CARD EDGE CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tetsuya Miyamura, Mie (JP); Daisuke Saito, Mie (JP); Yutaka Kobayashi, Mie (JP); Masanori Moriyasu, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 358 days.

(21) Appl. No.: 17/908,503

(22) PCT Filed: Feb. 16, 2021

(86) PCT No.: PCT/JP2021/005591
§ 371 (c)(1),
(2) Date: Aug. 31, 2022

(87) PCT Pub. No.: WO2021/182026
PCT Pub. Date: Sep. 16, 2021

(65) Prior Publication Data

US 2023/0155323 A1 May 18, 2023

(30) Foreign Application Priority Data

Mar. 9, 2020 (JP) ................................ 2020-039470

(51) Int. Cl.
*H01R 13/631* (2006.01)
*H01R 12/72* (2011.01)
*H01R 13/502* (2006.01)

(52) U.S. Cl.
CPC ......... *H01R 13/631* (2013.01); *H01R 12/721* (2013.01); *H01R 13/502* (2013.01)

(58) Field of Classification Search
CPC .... H01R 13/631; H01R 13/502; H01R 12/72; H01R 12/721; H01R 12/722;
(Continued)

(56) References Cited

U.S. PATENT DOCUMENTS 4,867,711 A * 9/1989 Yuasa ................ H01R 13/4362 439/744
5,252,096 A * 10/1993 Okada ................ H01R 13/4362 439/752
(Continued)

OTHER PUBLICATIONS

International Search Report issued on Apr. 13, 2021 for WO 2021/182026 A1 (4 pages).

*Primary Examiner* — Harshad C Patel
(74) *Attorney, Agent, or Firm* — Venjuris, P.C.

(57) ABSTRACT

A circuit board (62) is arranged in a receptacle (61). A housing (11, 12) having an accommodation space (21) is fit into the receptacle (61). A protecting member (14) is arranged movably to an initial position and a connection position in the housing (11, 12). A terminal fitting (13) includes a contact point portion (25) facing the accommodation space (21). The protecting member (14) includes a body portion (41) to be located on an opening side of the accommodation space (21) at the initial position and retracted from the opening side of the accommodation space (21) at the connection position, and a hooked portion (42) connected to an end part of the body (41). The receptacle (61) includes a hooking portion (64) on an inner surface for
(Continued)

moving the protecting member (14) from the connection position to the initial position by hooking the hooked portion (42).

4 Claims, 11 Drawing Sheets

(58) Field of Classification Search
CPC .... H01R 12/724; H01R 12/732; H01R 12/75; H01R 12/77; H01R 12/774; H01R 12/82
USPC .......................................................... 439/325
See application file for complete search history.

(56) References Cited

U.S. PATENT DOCUMENTS

| | | | | | |
|---|---|---|---|---|---|
| 5,358,427 | A * | 10/1994 | Miwa | H01R 13/4362<br>439/752 |
| 5,464,356 | A * | 11/1995 | Nebeshima | H01R 13/4362<br>439/752 |
| 5,890,932 | A * | 4/1999 | Muta | H01R 13/4223<br>439/682 |
| 6,435,919 | B1 * | 8/2002 | Saka | H01R 43/24<br>439/752 |
| 6,527,583 | B2 * | 3/2003 | Plate | H01R 13/4362<br>439/157 |
| 6,648,699 | B1 * | 11/2003 | Makino | H01R 13/4362<br>439/752 |
| 6,780,069 | B2 * | 8/2004 | Scherer | H01R 13/6592<br>439/607.05 |
| 7,544,081 | B2 * | 6/2009 | Lim | H01R 13/4361<br>439/352 |
| 9,160,095 | B2 * | 10/2015 | Littek | H01R 13/6272 |
| 9,787,014 | B2 * | 10/2017 | Nagasawa | H01R 13/4362 |
| 9,831,578 | B2 * | 11/2017 | Mizuguchi | H01R 13/4361 |
| 9,985,380 | B2 * | 5/2018 | Kwon | H01R 13/506 |
| 10,256,558 | B2 * | 4/2019 | Moriyasu | H01R 13/629 |
| 10,622,746 | B2 * | 4/2020 | Abraham | H01R 13/4362 |
| 10,673,169 | B2 * | 6/2020 | Jabrane | H01R 13/6272 |
| 11,942,715 | B2 * | 3/2024 | Tian | H01R 13/424 |
| 2002/0086571 | A1 | 7/2002 | Fujita et al. | |
| 2008/0009171 | A1 * | 1/2008 | Tsuji | H01R 13/6272<br>439/352 |
| 2014/0294349 | A1 * | 10/2014 | Nishio | G02B 6/4284<br>385/77 |
| 2019/0027849 | A1 | 1/2019 | Moriyasu et al. | |

* cited by examiner

CARD EDGE CONNECTOR

CROSS REFERENCE TO RELATED APPLICATIONS

This application is a national phase of PCT application No. PCT/JP2021/005591, filed on 16 Feb. 2021, which claims priority from Japanese patent application No. 2020-039470, filed on 9 Mar. 2020, all of which are incorporated herein by reference.

TECHNICAL FIELD

The present disclosure relates to a card edge connector.

BACKGROUND

A card edge connector described in Patent Document 1 is provided with a circuit board, a housing having a board accommodation space into which the circuit board is inserted, terminal fittings to be accommodated into the housing and a movable member (hereinafter, referred to as a protecting member) to be arranged movably to an initial position and a connection position in the housing. The terminal fitting includes a resilient contact piece configured to resiliently contact the circuit board. The protecting member covers an end surface of the circuit board on an opening side of the board accommodation space at the initial position. The protecting member moves to a back side of the board accommodation space, i.e. to the connection position, by being pushed by the circuit board. The protecting member includes a locking protrusion and the circuit board includes a locking recess. The locking protrusion and the locking recess are locked to each other when the circuit board is withdrawn.

When the protecting member is at the initial position, the end surface of the circuit board is covered by the protecting member on the opening side of the board accommodation space, whereby the interference of the resilient contact piece of the terminal fitting with the circuit board can be avoided. In withdrawing the circuit board from the board accommodation space, the protecting member can return to the initial position integrally with the circuit board since the locking protrusion and the locking recess are locked to each other.

PRIOR ART DOCUMENT

Patent Document

Patent Document 1: JP 2017-054590 A

SUMMARY OF THE INVENTION

Problems to be Solved

Since the circuit board is poor in workability, there is a problem that the locking recess provided in the circuit board has a low degree of freedom in design. Further, unless the disposed position of the circuit board in a receptacle is proper, it may not be possible to realize the locked state of the locking protrusion and the locking recess.

Accordingly, the present disclosure aims to provide a card edge connector improved in the degree of freedom in design and dimensional accuracy of a structure for returning a protecting member to an initial position.

Means to Solve the Problem

The present disclosure is directed to a card edge connector with a tubular receptacle, a circuit board to be arranged in the receptacle, a housing to be fit into the receptacle, the housing having an accommodation space for the circuit board, a terminal fitting to be accommodated into the housing, and a protecting member to be arranged movably to an initial position and a connection position in the housing, wherein the terminal fitting includes a contact point portion facing the accommodation space and to be electrically connected to the circuit board, the protecting member includes a body portion for restricting connection of the circuit board and the contact point portion by being located on an opening side of the accommodation space at the initial position and allowing the connection of the circuit board and the contact point portion by being retracted from the opening side of the accommodation space at the connection position and a hooked portion connected to an end part of the body portion and projecting toward an outer surface side of the housing, and the receptacle includes a hooking portion on an inner surface facing an outer surface of the housing, the hooking portion moving the protecting member from the connection position to the initial position by hooking the hooked portion.

Effect of the Invention

According to the present disclosure, it is possible to provide a card edge connector improved in the degree of freedom in design and dimensional accuracy of a structure for returning a protecting member to an initial position.

DETAILED DESCRIPTION TO EXECUTE THE INVENTION

Description of Embodiments of Present Disclosure

Figure 1:
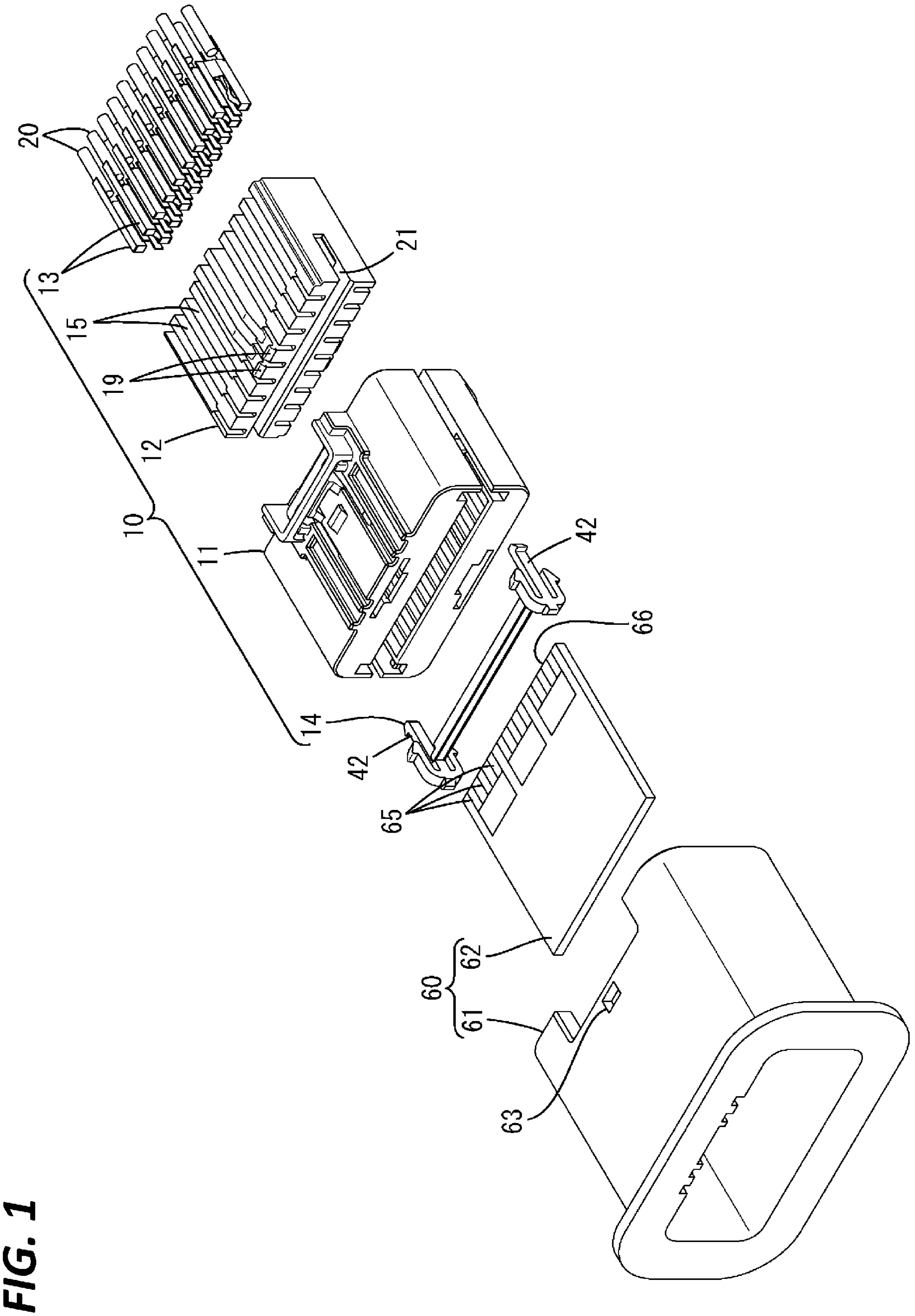
FIG. 1 is an exploded perspective view of a card edge connector according to an embodiment.

First, embodiments of the present disclosure are listed and described.

(1) The card edge connector of the present disclosure is provided with a tubular receptacle, a circuit board to be arranged in the receptacle, a housing to be fit into the receptacle, the housing having an accommodation space for the circuit board, a terminal fitting to be accommodated into the housing, and a protecting member to be arranged movably to an initial position and a connection position in the housing, wherein the terminal fitting includes a contact point portion facing the accommodation space and to be electrically connected to the circuit board, the protecting member includes a body portion for restricting connection of the circuit board and the contact point portion by being located on an opening side of the accommodation space at the initial position and allowing the connection of the circuit board and the contact point portion by being retracted from the opening side of the accommodation space at the connection position and a hooked portion connected to an end part of the body portion and projecting toward an outer surface side of the housing, and the receptacle includes a hooking portion on an inner surface facing an outer surface of the housing, the hooking portion moving the protecting member from the connection position to the initial position by hooking the hooked portion.

According to the above configuration, since the body portion is located on the opening side of the accommodation space when the protecting member is at the initial position, it can be avoided that the circuit board inserted into the accommodation space abuts on the body portion and the contact point portion of the terminal fitting interferes with the circuit board. When the protecting member is at the connection position, the body portion is retracted from the opening side of the accommodation space and a connected state of the contact point portion and the circuit board can be realized. Since the contact point portion of the terminal fitting can be prevented from abutting on a corner part and the like of the circuit board, the connected state of the contact point portion and the circuit board can be satisfactorily realized.

Further, according to the above configuration, in the process of separating the receptacle from the housing in withdrawing the circuit board from the accommodation space, the hooking portion of the receptacle can return the protecting member to the initial position by hooking the hooked portion of the protecting member. Since the hooking portion is provided on the inner surface of the receptacle, the degree of freedom in design and dimensional accuracy of the hooking portion can be enhanced.

(2) Preferably, the hooked portion is shaped to be deflectable and deformable with a part connected to the end part of the body portion as a fulcrum, and the housing has a restricting surface on the outer surface, the restricting surface being located away from a deflection space for the hooked portion with the protecting member located at the initial position and located in the deflection space for the hooked portion with the protecting member located at the connection position.

According to the above configuration, the hooking portion can contact and deflect the hooked portion with the protecting member located at the initial position. The hooked portion can resiliently return and the hooking portion can ride over the hooked portion in the process of fitting the receptacle and the housing. If the receptacle and the housing are properly fit and the protecting member reaches the connection position, the deflection of the hooked portion is restricted by the restricting surface of the housing. Since the deflection of the hooked portion is restricted in withdrawing the circuit board from the accommodation space, a hooked state of the hooking portion and the hooked portion can be prevented from being inadvertently released.

(3) Preferably, the circuit board has a pressing surface on an end surface, the pressing surface abutting on the protecting member at the initial position and moving the protecting member to the connection position, the protecting member includes a plurality of deflectable and deformable resilient holding portions, the housing includes a plurality of holding portions for restricting a movement of the protecting member from the initial position to the connection position by respectively locking the plurality of resilient holding portions, and a clearance is present between the pressing surface of the circuit board and the protecting member with the hooked portion hooked by the hooking portion at the connection position.

According to the above configuration, when the hooking portion hooks the hooked portion in withdrawing the circuit board from the accommodation space, the clearance is formed between the pressing surface of the circuit board and the protecting member and the deflection of the protecting member is allowed within a range of that clearance. Since a timing of each holding portion to ride over each resilient holding portion can be shifted when the protecting member returns to the initial position, a peak of resistance due to the interference of the respective resilient holding portions and the respective holding portions can be reduced.

Details of Embodiments of Present Disclosure

A specific example of a card edge connector of the present disclosure is described below with reference to the drawings. Note that the present invention is not limited to this illustration and is intended to be represented by claims and include all changes in the scope of claims and in the meaning and scope of equivalents.

A card edge connector according to an embodiment is composed of a female connector 10 and a male connector 60 connectable to each other. As shown in FIG. 1, the male connector 60 includes a receptacle 61 and a circuit board 62. The female connector 10 includes a housing 11, 12, a plurality of terminal fittings 13 and a protecting member 14. Further, the housing 11, 12 is composed of an outer housing 11 and an inner housing 12.

Figure 2:
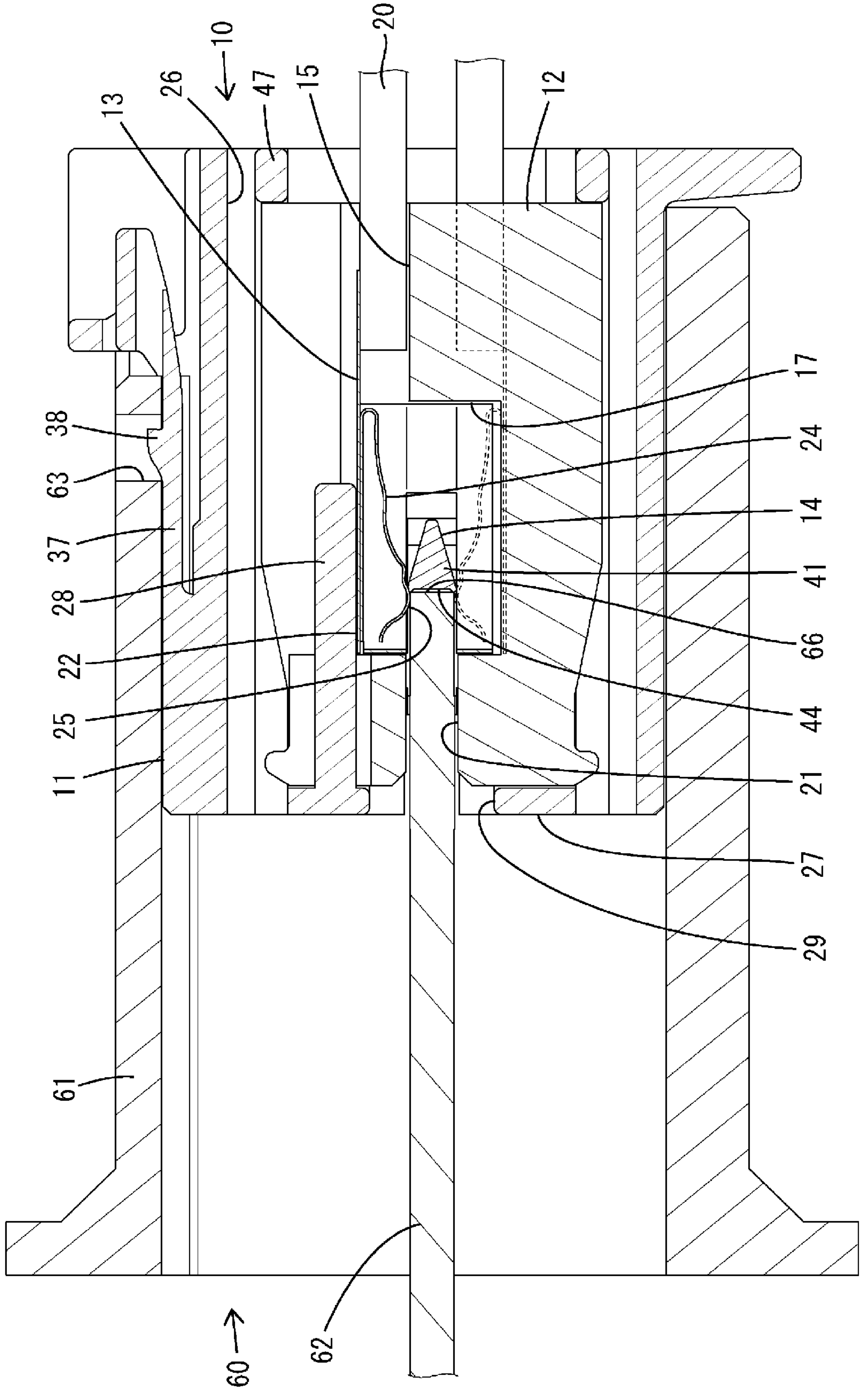
FIG. 2 is a side view in section of the card edge connector.

As shown in FIG. 2, the circuit board 62 is arranged in the receptacle 61. The terminal fittings 13 are accommodated into the housing 11, 12. The protecting member 14 is assembled with the housing 11, 12 movably to an initial position (see FIG. 5) and a connection position (see FIG. 2). The protecting member 14 protects later-described contact point portions 25 of the terminal fittings 13 at the initial position. The contact point portions 25 of the terminal fittings 13 are conductively connected to electrically conductive portions 65 of the circuit board 62 when the both connectors 10, 60 are properly connected. Note that, in the following description, a vertical direction is based on a vertical direction of FIG. 2 and surface sides facing each other when the connection of the both connectors 10, 60 is started are referred to as front sides concerning a front-rear direction.

(Receptacle and Circuit Board)

The receptacle 61 is made of synthetic resin and, as shown in FIGS. 1 and 2, in the form of a rectangular tube and hollow in the front-rear direction. The receptacle 61 is formed into a laterally long shape having a width in a lateral direction larger than a height in the vertical direction. A lock hole 63 is provided in the upper wall of the receptacle 61.

Figure 8:
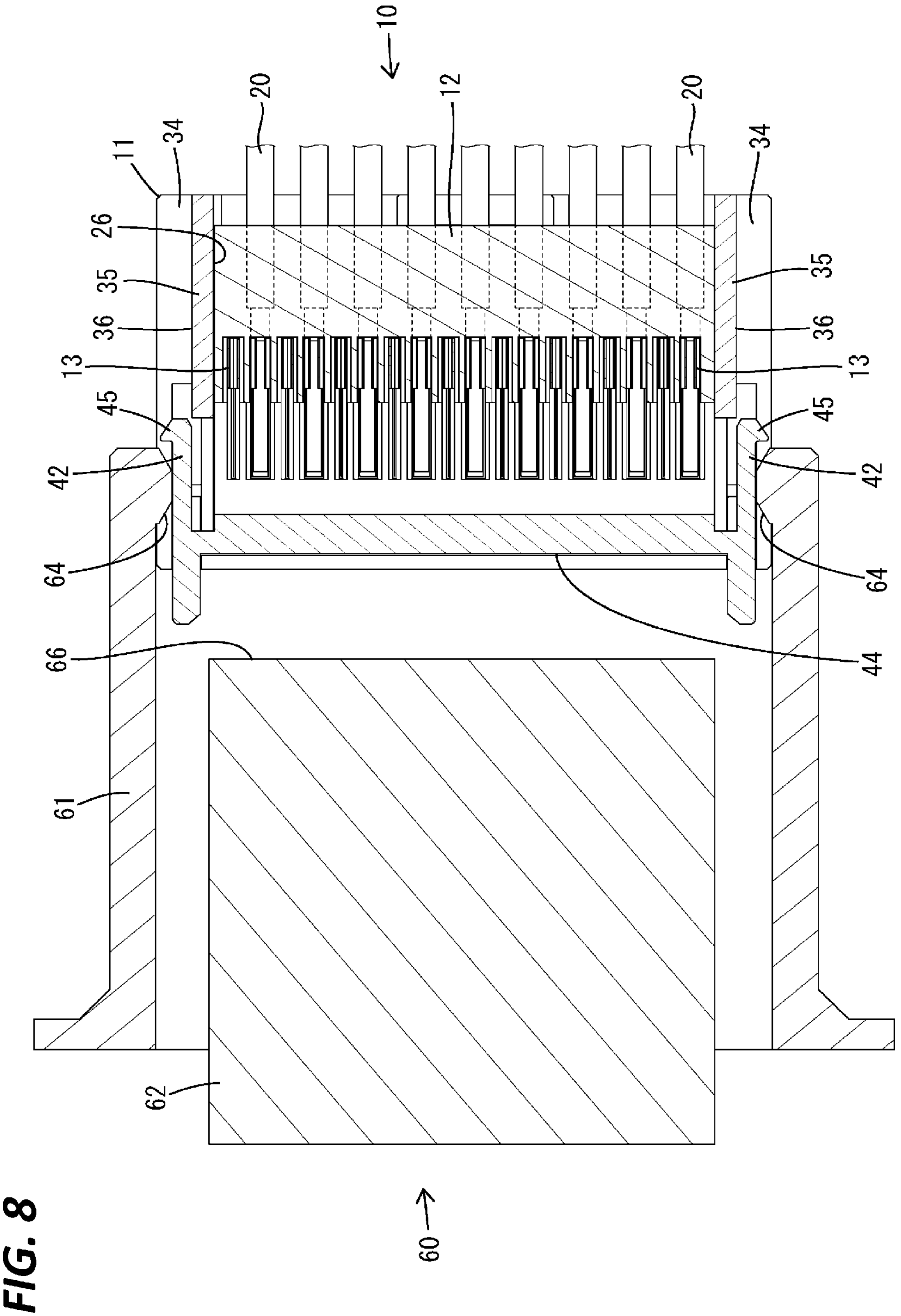
FIG. 8 is a plan view in section showing a state when the connection of both connectors is started.

As shown in FIG. 8, the receptacle 61 includes a pair of hooking portions 64 on the inner surfaces of left and right side walls. Each hooking portion 64 is provided in the form of a base projecting in a vertically central part of a front end part of the inner surface of the left/right side wall. An end surface (hereinafter, referred to as an inner end surface) of each hooking portion 64 in a projecting direction is shaped to be flat along the front-rear direction. The front surface of each hooking portion 64 is tapered and inclined rearward toward the inner end surface from the opening end of the receptacle 61. The rear surface of each hooking portion 64 is tapered and inclined forward toward the inner end surface. The receptacle 61 is mounted on an unillustrated case.

The circuit board 62 is also mounted on the case. Thus, relative positions of the circuit board 62 and the receptacle 61 are maintained to be fixed. The circuit board 62 is rectangular in a plan view and arranged in a vertically central part in the receptacle 61 with plate surfaces facing in the vertical direction. As shown in FIG. 1, a plurality of electrically conductive portions 65 are provided side by side in the width direction on surfaces of the circuit board 62. The respective electrically conductive portions 65 are arranged at positions corresponding to the respective terminal fittings 13.

The circuit board 62 has a pressing surface 66 for pressing the protecting member 14 on a front end surface (plate thickness surface) extending along the width direction. In the case of this embodiment, the pressing surface 66 is constituted by the entire front end surface of the circuit board 62.

(Inner Housing)

The inner housing 12 is made of synthetic resin and includes, as shown in FIG. 1, a plurality of cavities 15. As shown in FIG. 2, the plurality of cavities 15 are arranged side by side in the width direction in two upper and lower stages in the inner housing 12. Each cavity 15 is in the form of a vertically long slit and penetrates in the front-rear direction.

Figure 5:
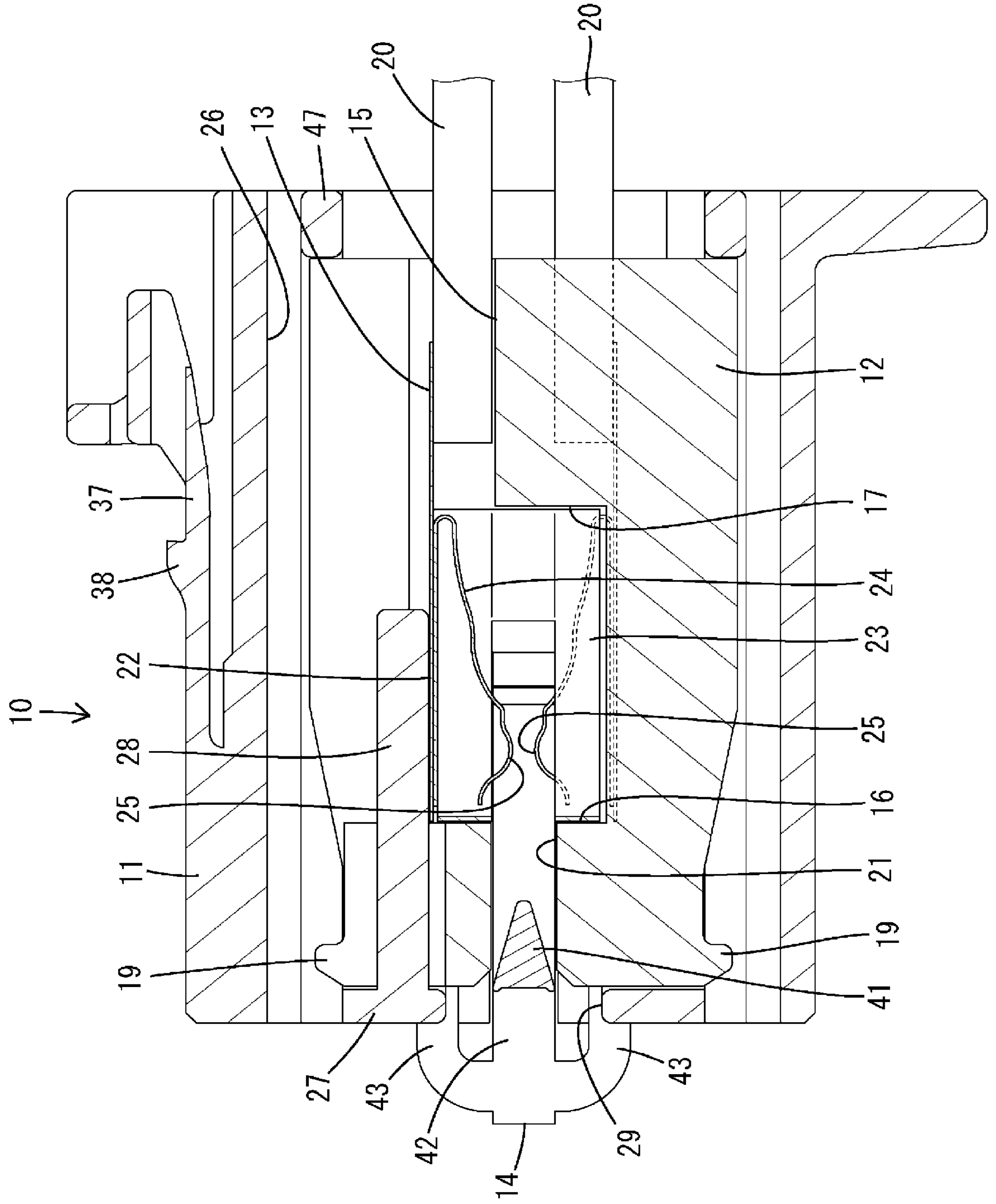
FIG. 5 is a side view in section showing a state where a protecting member is held at an initial position with respect to a housing in the female connector.
Figure 6:
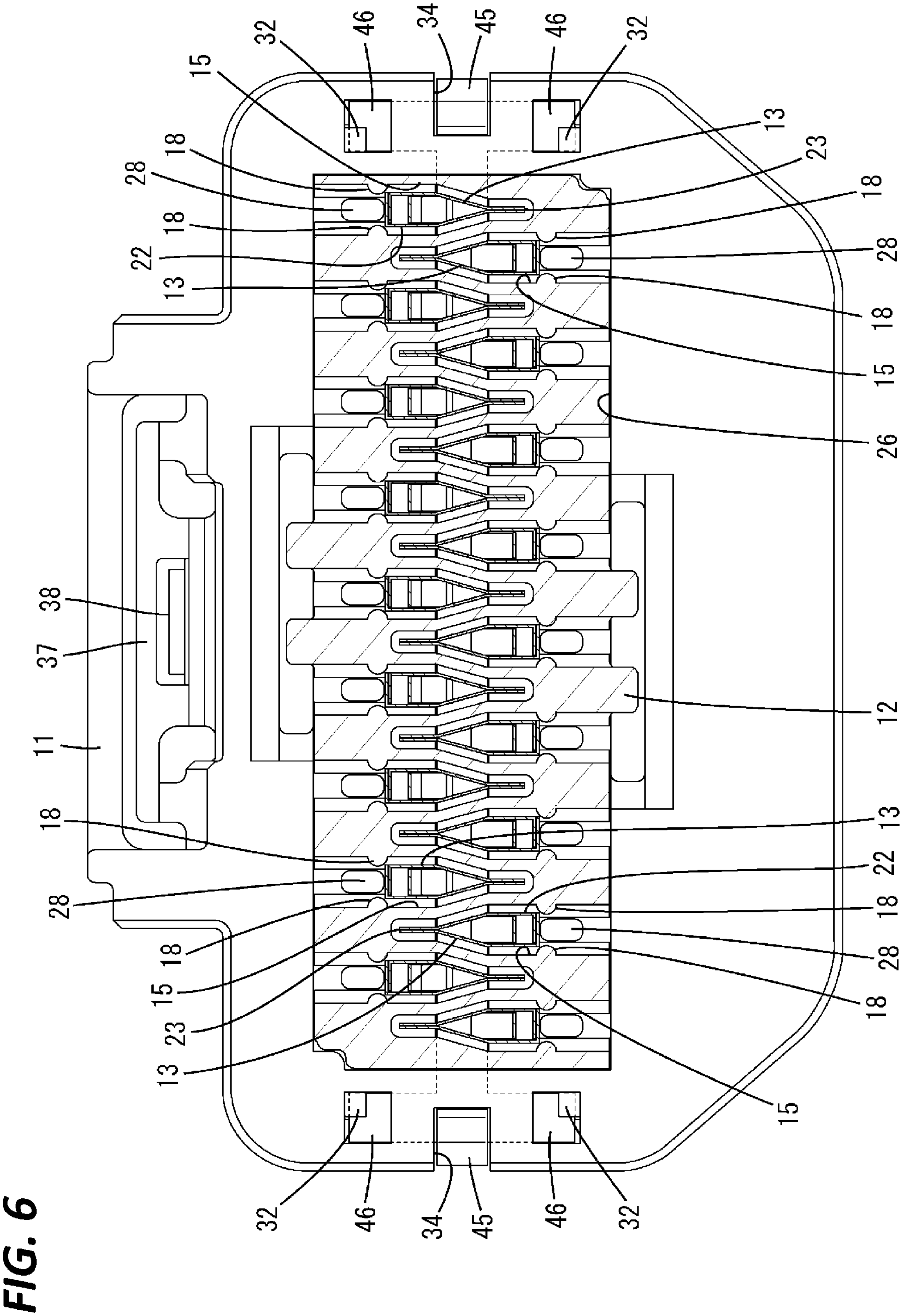
FIG. 6 is a transverse section showing a state where each terminal fitting is accommodated in each cavity in the female connector.

As shown in FIG. 5, each cavity 15 in the upper stage is open in the upper surface of the inner housing 12 and includes front and rear steps 16, 17 along the vertical direction at two positions spaced apart in the front-rear direction. Out of each cavity 15 in the upper stage, a vertical depth between the front and rear steps 16, 17 is larger than those on both front and rear sides of the steps 16, 17. Further, as shown in FIG. 6, an upper part of each cavity 15 in the upper stage is formed to have a larger opening width in the lateral direction than a lower part of each cavity 15 in the upper stage. The terminal fitting 13 is inserted into each cavity 15 in the upper stage from above. The inner housing 12 includes retaining portions 18 for restricting the terminal fittings 13 inserted into the respective cavities 15 in the upper stage from coming out upward. A pair of the retaining portions 18 project on left and right inner surfaces of the upper part of each cavity 15 in the upper stage.

Each cavity 15 in the lower stage is open in the lower surface of the inner housing 12 and includes front and rear steps 16, 17 along the vertical direction at two positions spaced apart in the front-rear direction, similarly to each cavity 15 in the upper stage. Out of each cavity 15 in the lower stage, a vertical depth between the front and rear steps 16, 17 is larger than those on both front and rear sides of the steps 16, 17. Further, a lower part of each cavity 15 in the lower stage is formed to have a larger opening width in the lateral direction than an upper part of each cavity 15 in the lower stage. The terminal fitting 13 is inserted into each cavity 15 in the lower stage from below. The inner housing 12 includes retaining portions 18 for restricting the terminal fittings 13 inserted into the respective cavities 15 in the lower stage from coming out downward. A pair of the retaining portions 18 project on left and right inner surfaces of the lower part of each cavity 15 in the lower stage.

As shown in FIG. 6, the respective cavities 15 in the upper and lower stages are arranged to deviate from each other in the width direction. Specifically, the wide upper parts of the respective cavities 15 in the upper stage and the narrow upper parts of the respective cavities 15 in the lower stage are arranged side by side in the width direction. Further, the narrow lower parts of the respective cavities 15 in the upper stage and the wide lower parts of the respective cavities 15 in the lower stage are arranged side by side in the width direction. In this way, the respective cavities 15 in the upper and lower stages are provided in alignment at narrow intervals with good space efficiency in the vertical direction and lateral direction in the inner housing 12.

As shown in FIG. 1, the inner housing 12 includes a pair of locking projections 19 arranged in the width direction in a widthwise central part of a front end part of an upper surface. Further, the inner housing 12 includes an accommodation space 21 in the form of a laterally long slit open in a vertically central part of a front surface. The accommodation space 21 is formed over the entire width of the inner housing 12 and also open in left and right side surfaces of the inner housing 12. As shown in FIG. 5, the accommodation space 21 communicates with the respective cavities 15 via the front steps 16. The back end of the accommodation space 21 is closed by the rear steps 17. As shown in FIG. 2, the circuit board 62 is inserted into the accommodation space 21 through a communication port 29 to be described later.

(Terminal Fittings)

Figure 13:
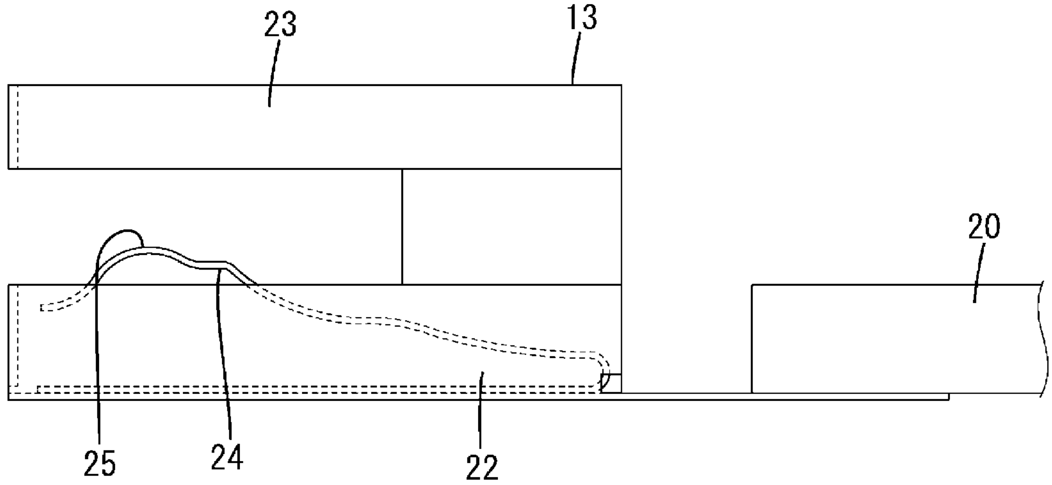
FIG. 13 is a side view of the terminal fitting.

The terminal fitting 13 is formed, such as by bending an electrically conductive metal plate. A rear part of the terminal fitting 13 is connected to an end part of a wire 20. As shown in FIG. 13, a front part of the terminal fitting 13 includes a tubular portion 22 in the form of a rectangular tube at a position on the same axis as the wire 20 in the front-rear direction and a plate-like portion 23 along the front-rear direction at a position facing the tubular portion 22 in a height direction. A surface of the tubular portion 22 facing the plate-like portion 23 is open. The front part of the terminal fitting 13 includes a deflectable and deformable resilient contact piece 24 inside the tubular portion 22. The resilient contact piece 24 has a chevron shape projecting toward the plate-like portion 23 through the open surface of the tubular portion 22 and includes a contact point portion 25 on a top part closest to the plate-like portion 23. As shown in FIG. 5, a separation distance between the tubular portion 22 and the plate-like portion 23 corresponds to an opening dimension of the accommodation space 21 in the height direction.

As shown in FIG. 6, the tubular portion 22 of the terminal fitting 13 is inserted into the wide upper part of each cavity 15 in the upper stage or the wide lower part of each cavity 15 in the lower stage. The plate-like portion 23 of the terminal fitting 13 is inserted into the narrow lower part of each cavity 15 in the upper stage or the narrow upper part of each cavity 15 in the lower stage. The circuit board 62 is inserted into between the tubular portion 22 and the plate-like portion 23 from front. The resilient contact piece 24 brings the contact point portion 25 into contact with the electrically conductive portion 65 of the circuit board 62 while being deflected and deformed.

(Outer Housing)

The outer housing 11 is made of synthetic resin and includes a housing assembly space 26 open in a rear surface inside. The outer housing 11 has a front wall 27 in a front surface. As shown in FIG. 5, the outer housing 11 includes terminal pressing portions 28 projecting into the housing assembly space 26 from the front wall 27. The inner housing 12 is inserted into the housing assembly space 26 from behind. As shown in FIG. 6, a plurality of the terminal pressing portions 28 are arranged at upper and lower positions corresponding to the respective cavities 15.

Figure 4:
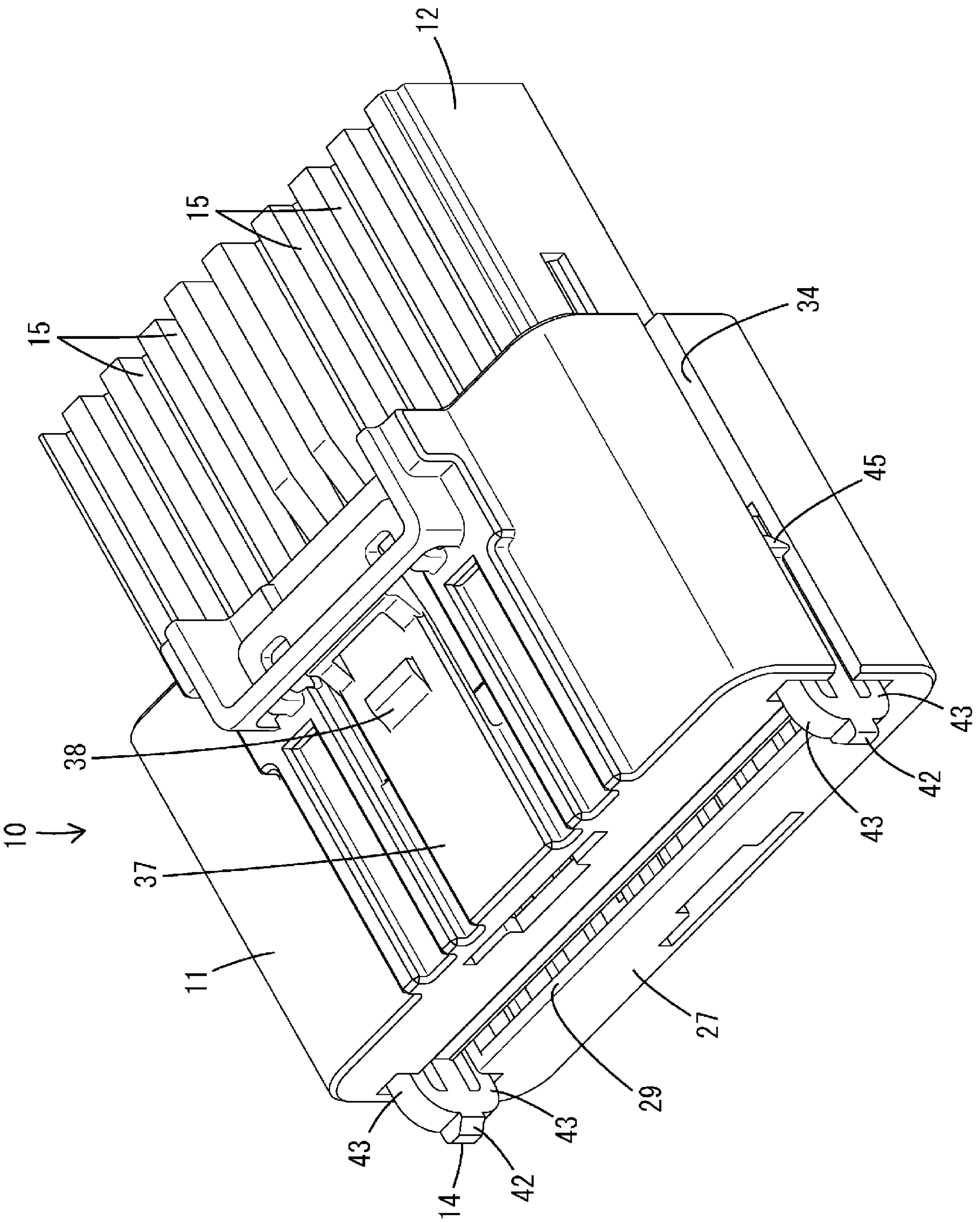
FIG. 4 is a perspective view showing a state where an inner housing is held at a partial locking position with respect to an outer housing in the female connector.

Here, the inner housing 12 is assembled movably to a partial locking position and a full locking position with respect to the outer housing 11. At the partial locking position, the inner housing 12 is shallowly inserted in the housing assembly space 26 and, as shown in FIG. 4, upper surface openings of the respective cavities 15 in the upper stage and lower surface openings of the respective cavities 15 in the lower stage are arranged to be exposed behind the outer housing 11. When the inner housing 12 is at the partial locking position, the respective terminal fittings 13 are inserted into the respective cavities 15. Note that a stopping portion 47 (see FIG. 5) for restricting the inner housing 12 at the partial locking position from coming out rearward by abutting on the respective locking projections 19 is provided in a rear end part of the outer housing 11.

On the other hand, at the full locking position, the inner housing 12 is inserted with a proper depth into the housing assembly space 26 and, as shown in FIG. 5, the respective terminal pressing portions 28 in the upper stage are arranged to enter front parts of the upper surface openings of the respective cavities 15 of the upper stage and the respective terminal pressing portions 28 in the lower stage are arranged to enter front parts of the lower surface openings of the respective cavities 15 of the lower stage. In this way, the respective terminal fittings 13 are restricted from coming out in the vertical direction. The inner housing 12 is arranged in contact with the front wall 27 of the outer housing 11 at the full locking position.

Figure 14:
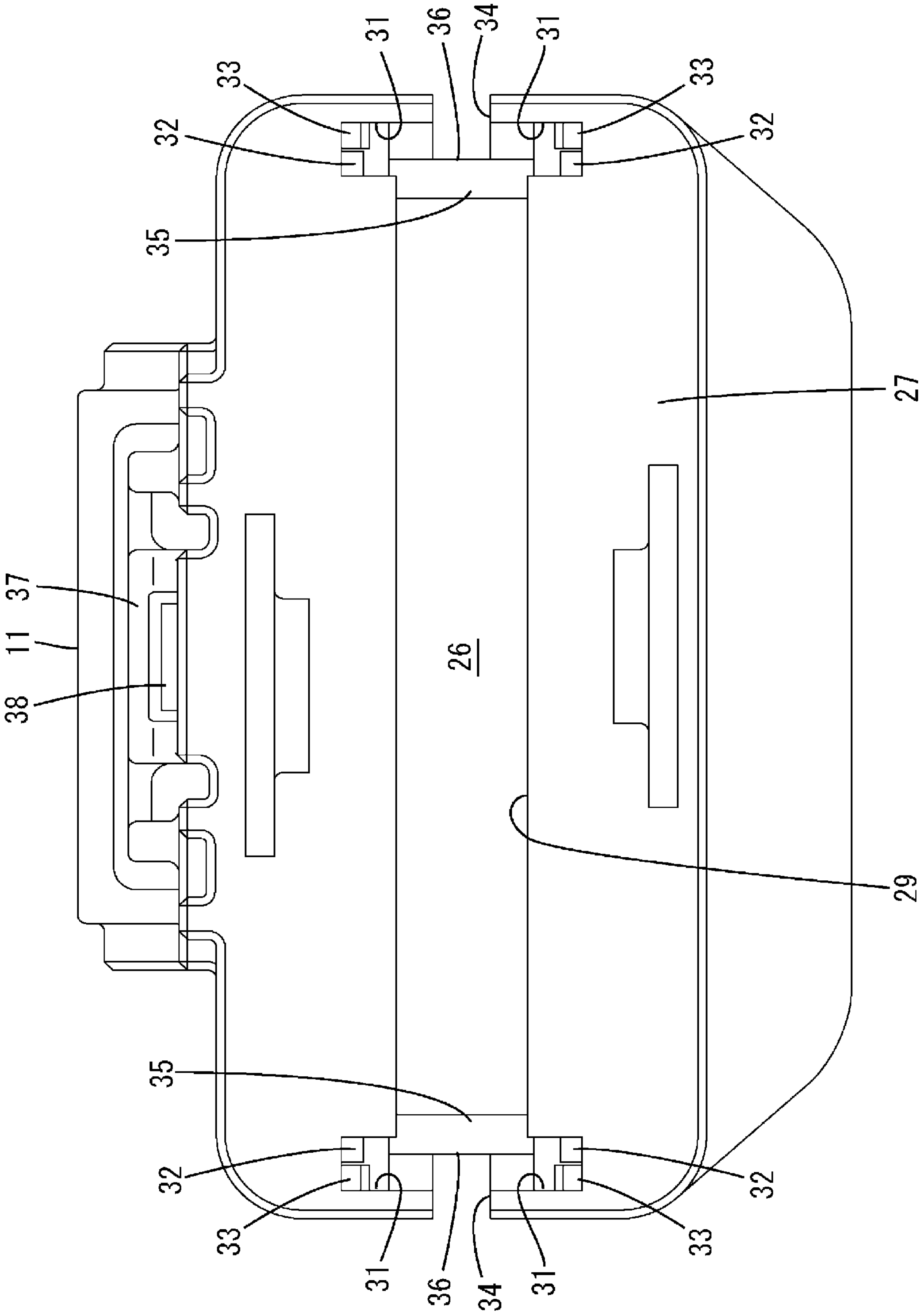
FIG. 14 is a front view of the outer housing.

As shown in FIG. 14, the outer housing 11 includes the laterally long communication port 29 open in a vertically central part of the front wall 27. The communication port 29 communicates with the housing assembly space 26 and also communicates with the accommodation space 21 with the inner housing 12 inserted in the housing assembly space 26.

Figure 7:
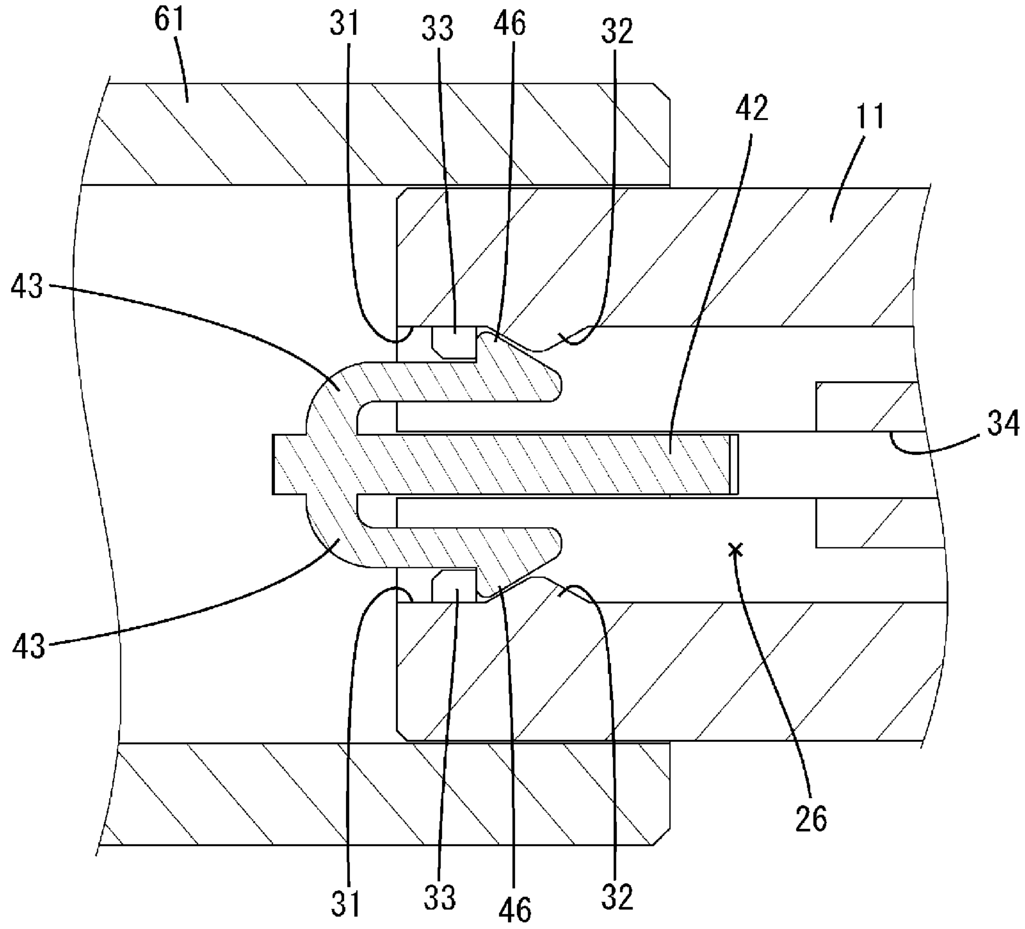
FIG. 7 is a side view in section showing a state where the protecting member is held at the initial position with respect to the housing by locking resilient holding portions and holding portions.

The outer housing 11 includes a pair of vertical grooves 31 extending on both upper and lower sides from each of both left and right ends of the communication port 29. The outer housing 11 includes first holding portions 32 and second holding portions 33 on the upper and lower surfaces of the respective vertical grooves 31. As shown in FIGS. 7 and 14, the first and second holding portions 32, 33 are shifted from each other in the front-rear direction and width direction. Specifically, the first holding portion 32 is provided behind and inward of the second holding portion 33. A later-described resilient holding portion 43 of the protecting member 14 is lockable to the first and second holding portions 32, 33.

Figure 3:
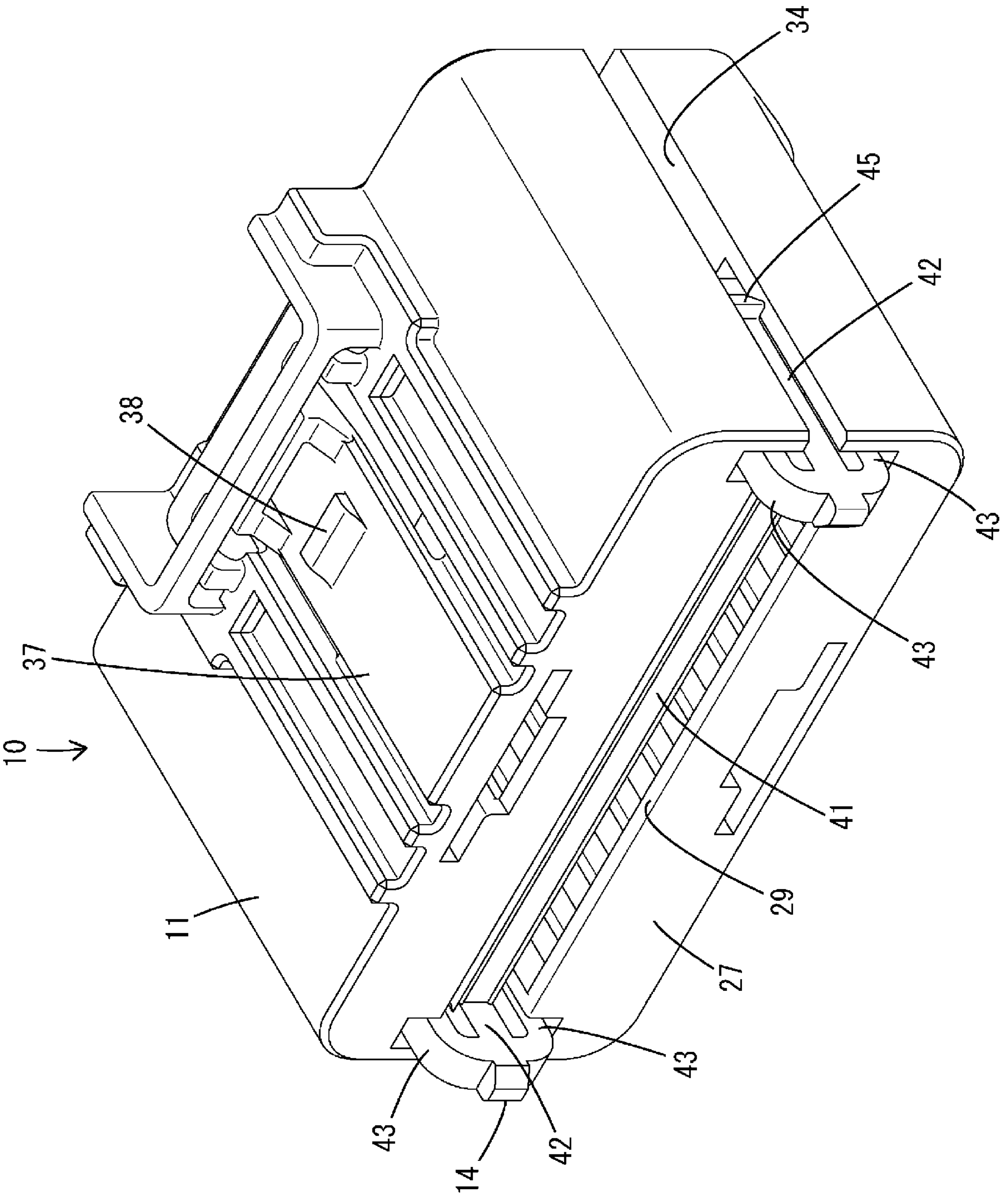
FIG. 3 is a perspective view of a female connector.

Further, the outer housing 11 includes a pair of groove portions 34 open in left and right side surfaces. Each groove portion 34 extends over the entire length of the outer housing 11 in the front-rear direction and is open in the front and rear surfaces of the outer housing 11. Each groove portion 34 communicates with the respective vertical grooves 31. As shown in FIG. 8, the outer housing 11 includes a pair of wall portions 35 near the left and right side surfaces in a rear part. The front end of each wall portion 35 is located on the rear ends of the respective vertical grooves 31. The inner surface of each wall portion 35 is arranged along the front-rear direction and facing the housing assembly space 26. The outer surface of each wall portion 35 is arranged along the front-rear direction and facing the groove portion 34. The outer surface of each wall portion 35 is constituted as a restricting surface 36 for restricting the deflection of a later-described hooked portion 42 of the protecting member 14. Further, as shown in FIG. 3, a deflectable and deformable lock arm 37 is provided to project on the upper surface of the outer housing 11. The lock arm 37 includes a lock protrusion 38 to be fit into the lock hole 63 of the receptacle 61.

(Protecting Member)

The protecting member 14 is made of synthetic resin and includes, as shown in FIG. 3, a body portion 41 in the form of a horizontal bar long in the width direction, a pair of the hooked portions 42 connected to both widthwise ends of the body portion 41 and extending on both front and rear sides and a pair of resilient holding portions 43 forked to an upper rear side and a lower rear side from the front end of each hooked portion 42.

The body portion 41 is sized to be insertable into the accommodation space 21. As shown in FIG. 5, a rear part of the body portion 41 is shaped to gradually reduce a vertical dimension toward a rear side. The body portion 41 has a receiving surface 44 arranged along the lateral direction on a front surface. As shown in FIG. 2, the receiving surface 44 of the body portion 41 is contacted and pressed by the pressing surface 66 of the circuit board 62.

Figure 9:
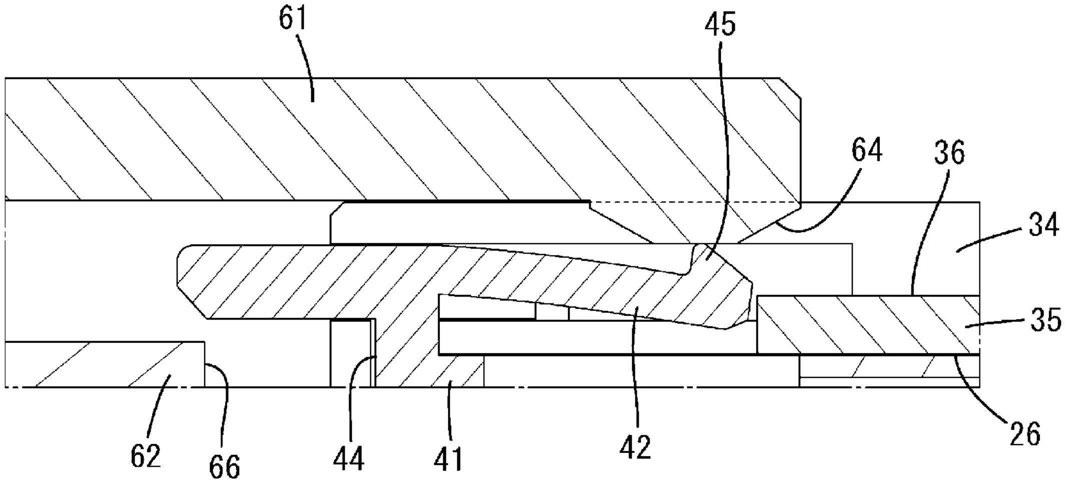
FIG. 9 is an enlarged plan view in section showing a state where a hooking portion is deflecting and deforming a hooked portion in a connection process of the both connectors.

As shown in FIG. 9, each hooked portion 42 is in the form of an arm long in the front-rear direction and deflectable and deformable in the width direction with a part connected to the body portion 41 as a fulcrum. Each hooked portion 42 includes a claw-like hooking projection 45 projecting outward in the width direction on the outer surface of a rear end part. The front surface of the hooking projection 45 is arranged along the lateral direction. The rear surface of the hooking projection 45 is tapered and inclined rearward.

As shown in FIG. 7, each resilient holding portion 43 is in the form of an arm extending rearward after projecting in a direction away from the hooked portion 42 and deflectable and deformable in the vertical direction with a part connected to the hooked portion 42 as a fulcrum. An entire length of each resilient holding portion 43 is shorter than that of each hooked portion 42. Each resilient holding portion 43 includes a claw-like holding projection 46 projecting outward in the height direction on the outer surface of a rear end part. The front surface of the holding projection 46 is arranged along the vertical direction. The rear surface of the holding projection 46 is tapered and inclined rearward.

(Assembly Method of Female Connector and Connection/Separation Method of Both Connectors)

In assembling the female connector 10, the inner housing 12 is first held at the partial locking position with respect to the outer housing 11 (see FIG. 4).

Subsequently, the terminal fittings 13 are inserted into the respective cavities 15 of the upper stage of the inner housing 12 from above, and the terminal fittings 13 are inserted into the respective cavities 15 of the lower stage of the inner housing 12 from below. The tubular portion 22 of each terminal fitting 13 is fit between the front and rear steps 16, 17 and arranged in contact with the front and rear steps 16, 17. In this way, each terminal fitting 13 is restricted from being shifted in the front-rear direction with respect to the inner housing 12 (see FIG. 5). Further, the tubular portion 22 of each terminal fitting 13 is arranged in contact with the left and right retaining portions 18 from inside (see FIG. 6). In this way, each terminal fitting 13 is primarily restricted from coming out from the cavity 15. In the inner housing 12, the respective terminal fittings 13 are arranged laterally side by side to face the accommodation space 21 with the respective contact point portions 25 thereof aligned at the same height position. Subsequently, the inner housing 12 is pushed into the outer housing 11 and moved toward the full locking position. When the inner housing 12 reaches the full locking position, each terminal pressing portion 28 is arranged along a flat plate part of the tubular portion 22 of each terminal fitting 13 (see FIG. 5). In this way, each terminal fitting 13 is secondarily and reliably restricted from coming out from the cavity 15.

The protecting member 14 is arranged at the initial position with respect to the outer housing 11. Each resilient holding portion 43 enters the vertical groove 31 and the holding projection 46 of each resilient holding portion 43 is arranged to be sandwiched in the front-rear direction between the first and second holding portions 32, 33 (see FIG. 7). In this way, the protecting member 14 is restricted from being shifted in the front-rear direction with respect to the outer housing 11. With the protecting member 14 located at the initial position, the body portion 41 is arranged to be fit into an inner space on the opening side of the accommodation space 21 (see FIG. 5). Further, the hooked portions 42 enter the housing assembly space 26 and the groove portions 34 through the communication port 29.

In the process of assembling the protecting member 14 at the initial position, the hooking projections 45 of the hooked portions 42 are displaced in the groove portions 34. When the protecting member 14 is at the initial position, the hooking projections 45 of the hooked portions 42 are located on back end sides (rear end sides) of the groove portions 34 and arranged to project into the groove portions 34 (see FIG. 3).

In this state, the both connectors 10, 60 are connected to each other. In a connection process of the both connectors 10, 60, the outer housing 11 is shallowly fit into the receptacle 61 and each hooking portion 64 enters the groove portion 34. At this time, the inner end surfaces of the respective hooking portions 64 are arranged to be contactable along the outer surfaces of the respective hooked portions 42 of the protecting member 14 (see FIG. 8). As the connection of the both connectors 10, 60 proceeds, the hooking portions 64 slide in contact with the hooking projections 45 of the hooked portions 42 and the hooked portions 42 are deflected and deformed into the vertical grooves 31 (deflection spaces on the side of the housing assembly space 26) (see FIG. 9). At this time, clearances are secured between the hooked portions 42 being deflected and deformed and the wall portions 35 and the hooked portions 42 do not interfere with the wall portions 35.

Figure 10:
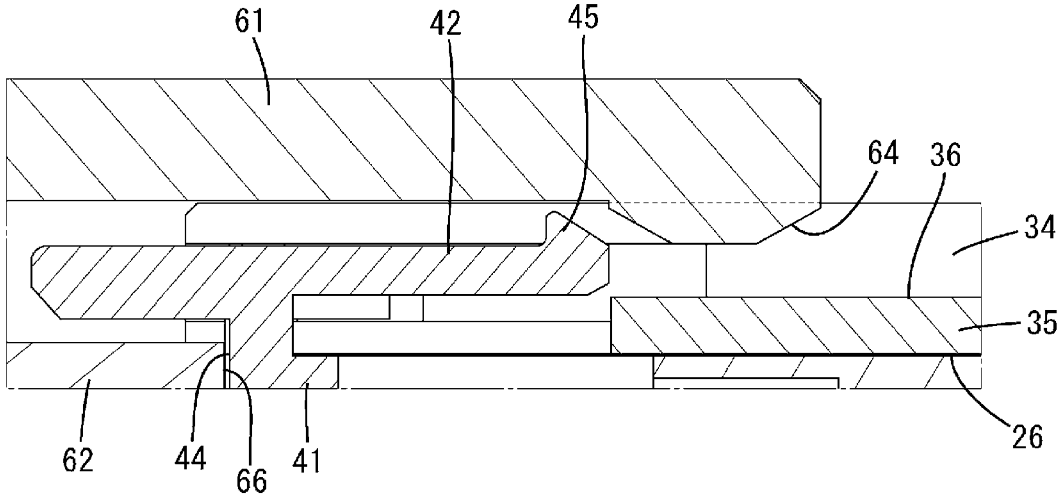
FIG. 10 is an enlarged plan view in section showing a state where the hooked portion resiliently returns from the state of FIG. 9 and the hooking portion is separated from the hooked portion.

As the connection of the both connectors 10, 60 further proceeds, the pressing surface 66 of the circuit board 62 is pressed against the receiving surface 44 of the body portion 41 and a rearward pressing force is applied to the protecting member 14. Associated with that, the resilient holding portions 43 are deflected and deformed by receiving the pressing force and a locked state of the holding projections 46 of the resilient holding portions 43 and the first holding portions 32 is released. At a position where the pressing surface 66 of the circuit board 62 abuts on the receiving surface 44 of the body portion 41, the hooked portions 42 have already resiliently returned and the hooking portions 64 are arranged away from and rearward of the hooked portions 42 (see FIG. 10).

As the connection of the both connectors 10, 60 further proceeds, the protecting member 14 is pushed by the circuit board 62 and moved to the connection position. The body portion 41 is displaced toward the back side from the opening side of the accommodation space 21. During this time, a contact state of the circuit board 62 and the body portion 41 is maintained and the circuit board 62 does not contact the contact point portions 25 of the terminal fittings 13.

Figure 11:
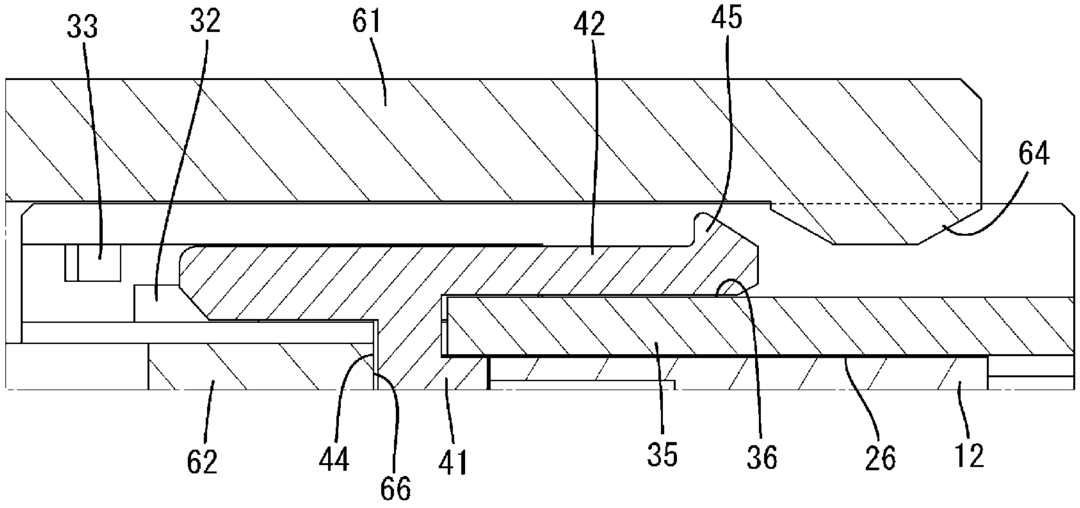
FIG. 11 is an enlarged plan view in section showing a state where the both connectors are properly connected and the deflection of the hooked portion is restricted by a restricting surface of a wall portion.

Immediately before the both connectors 10, 60 are properly connected, the resilient contact pieces 24 slide on slope parts of the body portion 41 to be deflected and deformed. When the both connectors 10, 60 are properly connected, the resilient contact pieces 24 resiliently return and the contact point portions 25 of the resilient contact pieces 24 ride over the body portion 41 and contact the electrically conductive portions 65 of the circuit board 62. In this way, the contact point portions 25 of the respective terminal fittings 13 and the respective electrically conductive portions 65 of the circuit board 62 are electrically connected (see FIG. 2). Then, the lock protrusion 38 of the lock arm 37 is fit into the lock hole 63 of the receptacle 61, whereby the both connectors 10, 60 are held in a connected state. With the both connectors 10, 60 properly connected, the inner surfaces of the rear parts of the hooked portions 42 are arranged along the restricting surfaces 36 of the wall portions 35 (see FIG. 11).

Figure 12:
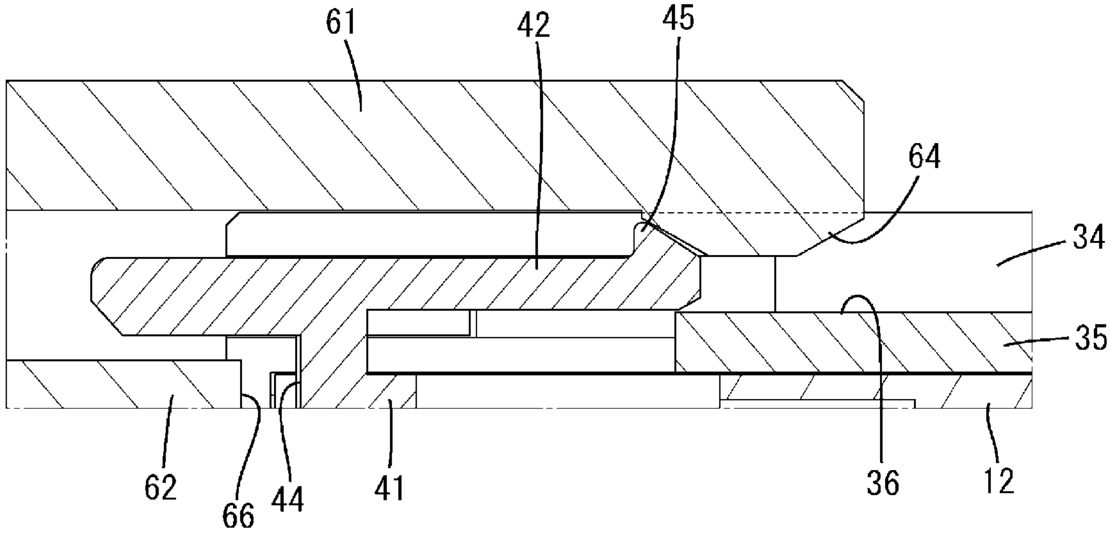
FIG. 12 is an enlarged plan view in section showing a state where the hooked portion is hooked by the hooking portion in a separation process of the both connector.

On the other hand, in withdrawing the circuit board 62 from the accommodation space 21 according to a situation such as maintenance, the lock arm 37 is deflected to locate the lock protrusion 38 outside the lock hole 63 and, in that state, the both connectors 10, 60 are pulled apart from each other. In a separation process of the both connectors 10, 60, slope parts of the hooking portions 64 abut on slope parts of the hooking projections 45 to apply a pressing force to the protecting member 14 in a return direction to the initial position. Here, since the deflection of the hooked portions 42 is restricted by the restricting surfaces 36 of the wall portions 35, the hooked portions 42 are not deflected and deformed by receiving the pressing force. Thus, the protecting member 14 can smoothly start to move toward the initial position (see FIG. 12).

Further, the pressing surface 66 of the circuit board 62 is arranged away from and forward of the receiving surface 44 of the body portion 41 when the slope parts of the hooking portions 64 and the slope parts of the hooking projections 45 abut on each other in the separation process of the both connectors 10, 60. That is, a clearance is formed in the front-rear direction between the body portion 41 of the protecting member 14 and the circuit board 62.

Immediately before a separating operation of the both connectors 10, 60 is completed, the hooked portions 42 are separated from the wall portions 35 and become deflectable and deformable. Further, immediately before the separating operation of the both connectors 10, 60 is completed, the holding projections 46 of the respective resilient holding portions 43 abut on the respective first holding portions 32 to be deflected and deformed. Here, since the pair of upper and lower resilient holding portions 43 are arranged on each side of the protecting member 14, there is a concern that resistance due to the interference of the respective resilient holding portions 43 and the respective first holding portions 32 increases.

However, in the case of this embodiment, since the clearance is formed between the body portion 41 of the protecting member 14 and the circuit board 62 as described above, the protecting member 14 can be inclined within a range of the clearance and an abutting timing of the holding projection 46 of each resilient holding portion 43 on each first holding portion 32 can be individually shifted. As a result, the resistance due to the interference of the respective resilient holding portions 43 and the respective first holding portions 32 does not suddenly increase and a peak of the resistance can be suppressed to be small.

If the both connectors 10, 60 are pulled apart thereafter, the respective resilient holding portions 43 resiliently return and the holding projections 46 of the respective resilient holding portions 43 are arranged to be sandwiched between the first and second holding portions 32, 33 again. Since the holding projections 46 abut on the second holding portions 33 in a direction perpendicular to a separating direction, the protecting member 14 is reliably held at the partial locking position with separation restricted. In this way, the protecting member 14 can return to the partial locking position and can be repeatedly used.

As described above, according to this embodiment, since the body portion 41 is located on the opening side of the accommodation space 21 when the protecting member 14 is at the initial position, it can be avoided that the circuit board 62 inserted into the accommodation space 21 abuts on the body portion 41 and the contact point portions 25 of the terminal fittings 13 interfere with the circuit board 62. When the protecting member 14 is at the connection position, the body portion 41 is retracted from the opening side of the accommodation space 21 and a connected state of the contact point portions 25 and the circuit board 62 can be realized. Since the contact point portions 25 of the terminal fittings 13 can be prevented from abutting on a corner part and the like of the circuit board 62, the connected state of the contact point portions 25 and the circuit board 62 can be satisfactorily realized.

Further, in the process of separating the receptacle 61 from the housing 11, 12 in withdrawing the circuit board 62 from the accommodation space 21, the hooking portions 64 can return the protecting member 14 to the initial position by hooking the hooked portions 42. In this case, since the hooking portions 64 are provided on the inner surface of the receptacle 61, the degree of freedom in design and dimensional accuracy of the hooking portions 64 can be enhanced.

Further, in the case of this embodiment, the hooking portions 64 can contact and deflect the hooked portions 42 with the protecting member 14 located at the initial position. On the other hand, if the protecting member 14 reaches the connection position, the deflection of the hooked portions 42 is restricted by the restricting surfaces 36 of the housing 11, 12. Since the deflection of the hooked portions 42 is restricted in withdrawing the circuit board 62 from the accommodation space 21, a hooked state of the hooking portions 64 and the hooked portions 42 can be prevented from being inadvertently released.

Furthermore, when the hooking portions 64 hook the hooked portions 42 in the separation process of the both connectors 10, 60, the clearance is formed between the pressing surface 66 of the circuit board 62 and the protecting member 14 and the protecting member 14 is allowed to be inclined within the range of the clearance. Thus, a timing of each resilient holding portion 43 to ride over the first holding portion 32 can be shifted by inclining the protecting member 14. As a result, a peak of resistance due to the interference of the respective resilient holding portions 43 and the respective first holding portions 32 can be suppressed to be small.

Other Embodiments of Present Disclosure

The embodiment disclosed this time should be considered illustrative in all aspects, rather than restrictive.

Although the housing is composed of the inner housing and the outer housing in the case of the above embodiment, the housing may be integrally configured to be undividable in another embodiment.

Although the hooking portions are fixedly provided in the receptacle and the hooked portions are deflectably and deformably provided on the end part of the protecting member in the case of the above embodiment, the hooking portions may be deflectably and deformably provided in the receptacle and the hooked portions may be fixedly provided on the end part of the protecting member in another embodiment.

Although the holding projection is provided on the resilient holding portion and the first and second holding portions are provided in the housing and the holding projection is sandwiched between the first and second holding portions in the case of the above embodiment, the resilient holding portion may be provided with two holding projections and the housing may be provided with one holding portion and the holding portion of the housing may be sandwiched between the two holding projections of the resilient holding portion in another embodiment.

LIST OF REFERENCE NUMERALS

10 . . . female connector
11 . . . outer housing (housing)
12 . . . inner housing (housing)
13 . . . terminal fitting
14 . . . protecting member
15 . . . cavity
16, 17 . . . step
18 . . . retaining portion
19 . . . locking projection
20 . . . wire
21 . . . accommodation space
22 . . . tubular portion
23 . . . plate-like portion
24 . . . resilient contact piece
25 . . . contact point portion
26 . . . housing assembly space
27 . . . front wall
28 . . . terminal pressing portion
29 . . . communication port
31 . . . vertical groove
32 . . . first holding portion (holding portion)
33 . . . second holding portion
34 . . . groove portion
35 . . . wall portion
36 . . . restricting surface
37 . . . lock arm
38 . . . lock protrusion
41 . . . body portion
42 . . . hooked portion
43 . . . resilient holding portion

44 . . . receiving surface
45 . . . hooking projection
46 . . . holding projection
47 . . . stopping portion
60 . . . male connector
61 . . . receptacle
62 . . . circuit board
63 . . . lock hole
64 . . . hooking portion
65 . . . electrically conductive portion
66 . . . pressing surface

What is claimed is:

1. A card edge connector, comprising:
a tubular receptacle;
a circuit board to be arranged in the receptacle;
a housing to be fit into the receptacle, the housing having an accommodation space for the circuit board;
a terminal fitting to be accommodated into the housing; and
a protecting member to be arranged movably to an initial position and a connection position in the housing,
wherein:
the terminal fitting includes a contact point portion facing the accommodation space and to be electrically connected to the circuit board,
the protecting member includes:
a body portion for restricting connection of the circuit board and the contact point portion by being located on an opening side of the accommodation space at the initial position and allowing the connection of the circuit board and the contact point portion by being retracted from the opening side of the accommodation space at the connection position; and
a hooked portion connected to an end part of the body portion and projecting toward an outer surface side of the housing,
the receptacle includes a hooking portion on an inner surface facing an outer surface of the housing, the hooking portion moving the protecting member from the connection position to the initial position by hooking the hooked portion,
the circuit board has a pressing surface on an end surface, the pressing surface abutting on the protecting member at the initial position and moving the protecting member to the connection position,
the protecting member includes a plurality of deflectable and deformable resilient holding portions,
the housing includes a plurality of holding portions for restricting a movement of the protecting member from the initial position to the connection position by respectively locking the plurality of resilient holding portions,
a clearance is present between the pressing surface of the circuit board and the protecting member with the hooked portion hooked by the hooking portion at the connection position, and
the hooked portion becomes deflectable and deformable, the resilient holding portions abut on the holding portions to be deflected and deformed and the protecting member is allowed to be inclined within a range of the clearance immediately before a separating operation of the receptacle and the housing is completed.

2. The card edge connector of claim 1, wherein:
the hooked portion is deflectable and deformable into a deflection space, and
the housing has a restricting surface on the outer surface, the restricting surface being located away from the deflection space for the hooked portion with the protecting member located at the initial position and located in the deflection space for the hooked portion with the protecting member located at the connection position.

3. A card edge connector, comprising:
a tubular receptacle;
a circuit board to be arranged in the receptacle;
a housing to be fit into the receptacle, the housing having an accommodation space for the circuit board;
a terminal fitting to be accommodated into the housing; and
a protecting member to be arranged movably to an initial position and a connection position in the housing,
wherein:
the terminal fitting includes a contact point portion facing the accommodation space and to be electrically connected to the circuit board,
the protecting member includes:
a body portion for restricting connection of the circuit board and the contact point portion by being located on an opening side of the accommodation space at the initial position and allowing the connection of the circuit board and the contact point portion by being retracted from the opening side of the accommodation space at the connection position; and
a hooked portion connected to an end part of the body portion and projecting toward an outer surface side of the housing,
the receptacle includes a hooking portion on an inner surface facing an outer surface of the housing, the hooking portion moving the protecting member from the connection position to the initial position by hooking the hooked portion,
the protecting member includes a plurality of deflectable and deformable resilient holding portions,
the housing includes a plurality of holding portions for restricting a movement of the protecting member from the initial position to the connection position by respectively locking the plurality of resilient holding portions,
the hooked portion is formed to extend in a front-rear direction and be to deflectable and deformable with a part connected to the body portion as a fulcrum, and
the plurality of resilient holding portions are paired and formed to extend in a forked state via the hooked portion.

4. The card edge connector of claim 3, wherein:
the circuit board has a pressing surface on an end surface, the pressing surface abutting on the protecting member at the initial position and moving the protecting member to the connection position, and
a clearance is present between the pressing surface of the circuit board and the protecting member with the hooked portion hooked by the hooking portion at the connection position.

* * * * *